(12) United States Patent
Johansson et al.

(10) Patent No.: US 8,613,585 B2
(45) Date of Patent: Dec. 24, 2013

(54) METHOD AND ARRANGEMENT FOR THE STACKING IN LAYERS OF TIMBER PACKAGES

(75) Inventors: Jan Johansson, Skellefteå (SE); Gunnar Marklund, Byske (SE)

(73) Assignee: Renholmen AB, Byske (SE)

( * ) Notice: Subject to any disclaimer, the term of this patent is extended or adjusted under 35 U.S.C. 154(b) by 371 days.

(21) Appl. No.: 12/776,277

(22) Filed: May 7, 2010

(65) Prior Publication Data

US 2010/0284776 A1 Nov. 11, 2010

(30) Foreign Application Priority Data

May 7, 2009 (SE) ........................................ 0900620

(51) Int. Cl.
*B65G 57/06* (2006.01)
*B65G 57/03* (2006.01)

(52) U.S. Cl.
USPC ........................................ 414/794.1; 414/799

(58) Field of Classification Search
USPC ........ 198/419.2, 419.3, 468.8, 689.1, 750.12, 198/773, 774.1, 799; 271/183, 189, 218; 414/790.2, 790.7, 790.8, 791.6, 791.8, 414/793.4, 793.5, 793.9, 794, 794.1, 794.2, 414/794.3, 795.2, 796.1, 923–924
See application file for complete search history.

(56) References Cited

U.S. PATENT DOCUMENTS

| | | | | |
|---|---|---|---|---|
| 3,446,103 A | * | 5/1969 | Foster | 83/96 |
| 3,529,732 A | * | 9/1970 | Wayne | 414/793.5 |
| 3,606,310 A | * | 9/1971 | Larson | 414/794.1 |
| 4,290,723 A | | 9/1981 | Johansson | |
| 4,642,013 A | * | 2/1987 | Mundus et al. | 414/790.7 |
| 6,655,902 B2 | * | 12/2003 | Dube et al. | 414/789.5 |
| 6,942,087 B2 | * | 9/2005 | Meyer | 198/427 |
| 2007/0140824 A1 | * | 6/2007 | Hogue et al. | 414/791.6 |
| 2007/0243056 A1 | * | 10/2007 | Simmons | 414/788.1 |
| 2009/0289411 A1 | * | 11/2009 | Dax | 271/189 |

* cited by examiner

*Primary Examiner* — Gregory Adams
(74) *Attorney, Agent, or Firm* — Knobbe, Martens, Olson & Bear, LLP

(57) ABSTRACT

The invention concerns a method and an arrangement for stacking timber packages in layer that uses a transfer arrangement comprising mobile carrier planes. The carrier planes in turn form a direct continuation of an input transporter in order to receive layers fed from this transporter by being caused to lift from below a complete layer from the input transporter and displacing the layer in over the stacking table. After that, the carrier planes are withdrawn from the stacking table while the layer of timber is scraped off from the carrier plane or, the stacking table is arranged to move downwards. The transfer arrangement uses a first, a second and a third carrier plane which are arranged to move mutually in a cycle in such a manner that one pair of two consecutive carrier planes is located at the same time at a position above the stacking table.

20 Claims, 3 Drawing Sheets

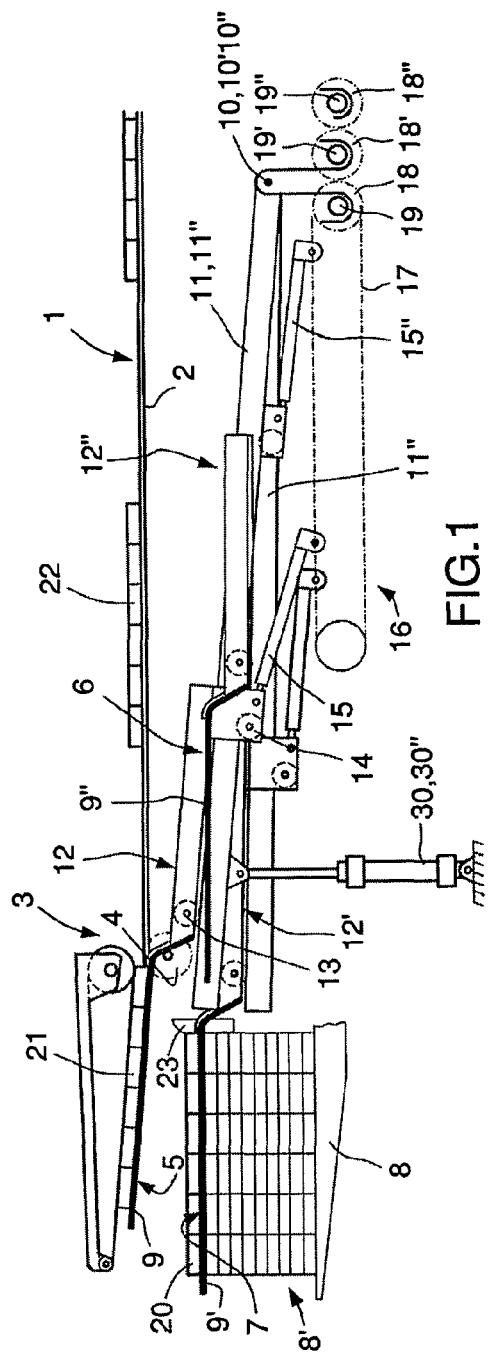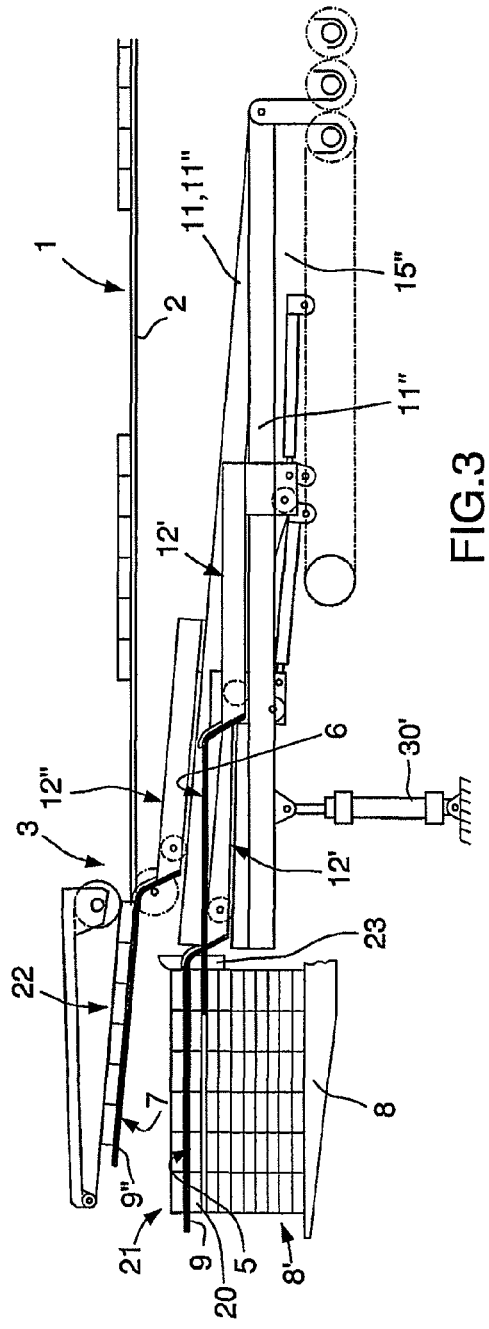

METHOD AND ARRANGEMENT FOR THE STACKING IN LAYERS OF TIMBER PACKAGES

CROSS-REFERENCE TO RELATED APPLICATIONS

This application claims priority to and the benefit of Swedish Patent Application No. 0900620-6, filed May 7, 2009, the disclosure of which is incorporated herein by reference in its entirety.

BACKGROUND OF THE INVENTION

1. Field of the Invention

The present invention relates to packagers and in particular to a method for the stacking in layers of timber packages, an arrangement for the stacking in layers of timber packages, and the use of carrier planes in a packagers.

2. Description of the Related Art

Several different methods and arrangements for the stacking in layers of sawn timber are known. These include such methods and arrangements in which the timber is collected in layers on an input transporter and fed forwards in its transverse direction, and from which transporter layers of a predetermined width are separated and transferred by means of transfer arms that are mobile in a forwards and backwards direction and that are designed as carrier planes to a packaging lift, whereby a package of layers laying one on top of another is formed. The lift is arranged to descend according to a program at the rate at which the package layers are collected on the carrier arms of the lift such that space is made available for the transfer of the subsequent layer. Stacking laths can be used between the layers during the packaging operation in order to promote drying of the package, depending on whether the timber that is to be packaged is dry or fresh. The said transfer arms that perform forwards and backwards motion are designed as a number of parallel fingers that are transverse to the longitudinal direction of the pieces of timber and are evenly distributed, arranged to lift from below layers of pieces of timber from the input transporter and subsequently to transport the layer in an essentially horizontal direction in over the lift arrangement. The transfer arms are subsequently drawn back while the layer of timber is scraped off from the transfer arms whereby the layer is placed directly onto the carrier arms of the lift arrangement if it is a case of the lowermost layer in a package, or onto the uppermost layer of timber in the lift arrangement, if layers of timber have been previously laid.

In order to scrape the layer from the transfer arms, retaining means that act against one edge of the layer function as counterpieces and in this way retain the layer over the lift arrangement while the transfer arms are withdrawn in the direction of the input transporter. There is, however, the problem, particularly with slender timber, that the pieces of timber tend to tip or become disorganised when the transfer arms are withdrawn. In order to solve the said problem, the solution of providing a holder is known, which holder can be brought from a withdrawn resting position to interact with the upper surface of the layer of timber and in this way to press down in a retaining manner the most recently laid layer of timber while the transfer arms are withdrawn from the layer. It should be understood in this part that the holder must be withdrawn such that it is located in a position that does not interfere when a new layer of timber can be placed onto the uppermost layer of timber in the lift arrangement. Consequently, the said holder as such is considerably limiting for the speed with which a packager can be run.

In addition to the holder that acts on the upper surface of the layer, the large forces that act on the transfer arms when these are displaced forwards and backwards while at the same time being lifted lead to limitations on achieving the desired transfer speeds. Furthermore, it becomes a requirement that it should be possible to handle with accurate control the layers of timber that are lying on the transfer arms, despite the large forces of acceleration and retardation that may arise during the transfer, and also that it is possible to achieve this when handling timber that differs considerably in dimension.

In the prior art forms of packager and packaging machines there is a striving to be able to increase the speed of the machine, and thus their capacities, from the current value of approximately 20 layers of timber per minute to 30 layers of timber per minute, or greater, i.e. to a capacity that corresponds to at least one layer of timber every 2 seconds.

U.S. Pat. No. 4,290,723 reveals a packager that is provided with a first and a second carrier plane that are cyclically mobile on arms. The carrier planes are arranged to lift one layer of timber at a time from the end of an input transporter down onto a stacking table, after which the layer is scraped from the carrier plane in interaction with a counterpiece that is arranged at the stacking table. The stacking cycle is so arranged that the two carrier planes, which follow one after the other, are located at a position under the input transporter, where the second carrier plane is located in a position of preparedness behind the first carrier plane, with the same gradient as this first plane, while the first carrier plane is filled with a layer of timber.

SUMMARY OF THE INVENTION

A first purpose of the present invention, therefore, is to achieve a method that makes it possible to increase the capacity of a timber packager without renouncing the requirement that it be possible to manage the layers of timber with accurate control at all times.

A second purpose of the invention is to achieve an arrangement that is designed for the execution of the method.

A third purpose of the invention is to achieve an advantageous use of the carrier planes during a portion of the procedure of stacking packages.

BRIEF DESCRIPTION OF THE DRAWINGS

FIG. 1 shows schematically a side view of an arrangement according to the invention in a first phase of the stacking cycle of the arrangement.

FIG. 3 shows a side view of an arrangement according to invention in a second phase of the stacking cycle of the arrangement.

DETAILED DESCRIPTION OF THE PREFERRED EMBODIMENT

Figure 2:
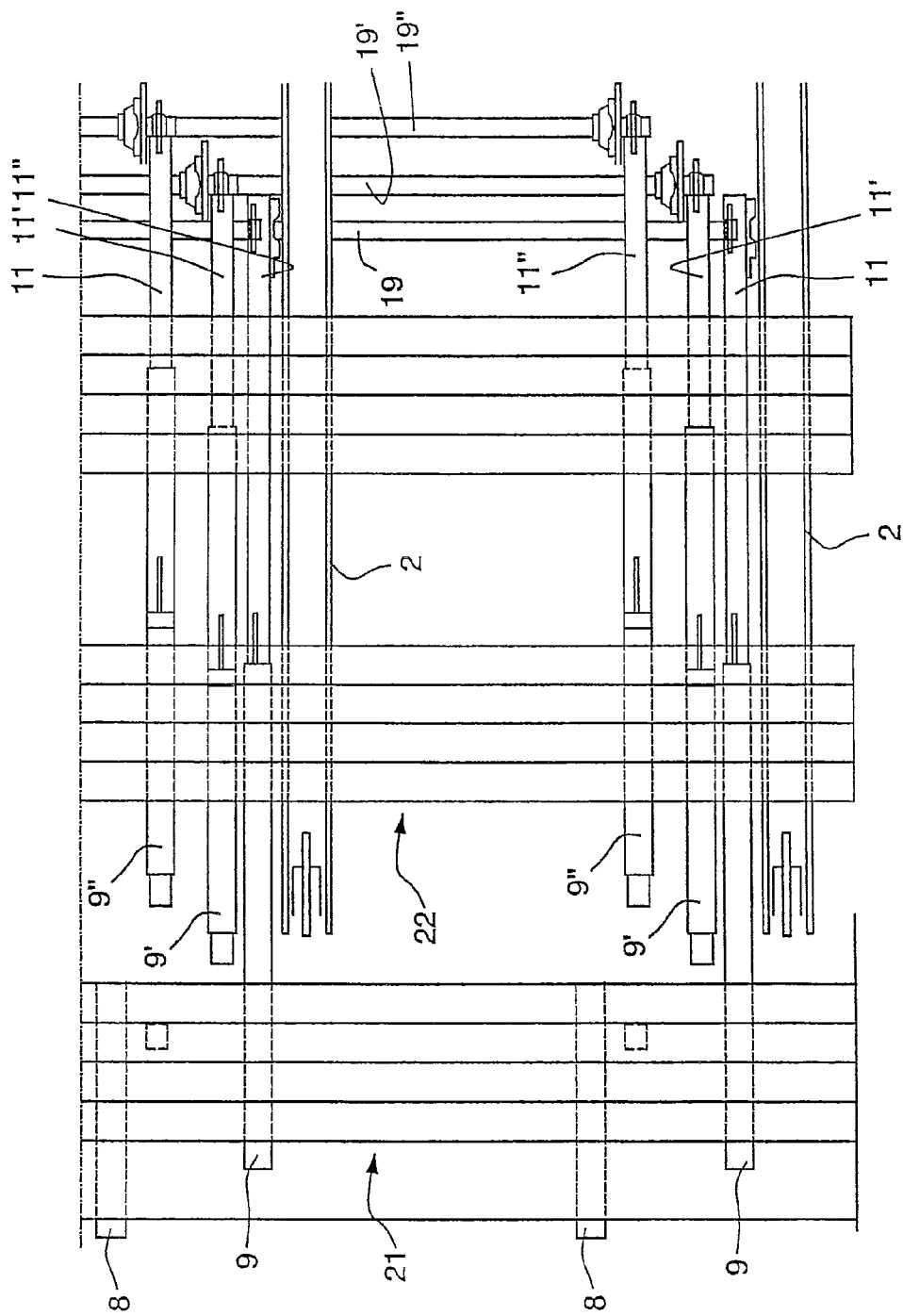
FIG. 2 shows a plan view of a part of the arrangement shown in FIGS. 1 and 3.
Figure 4:
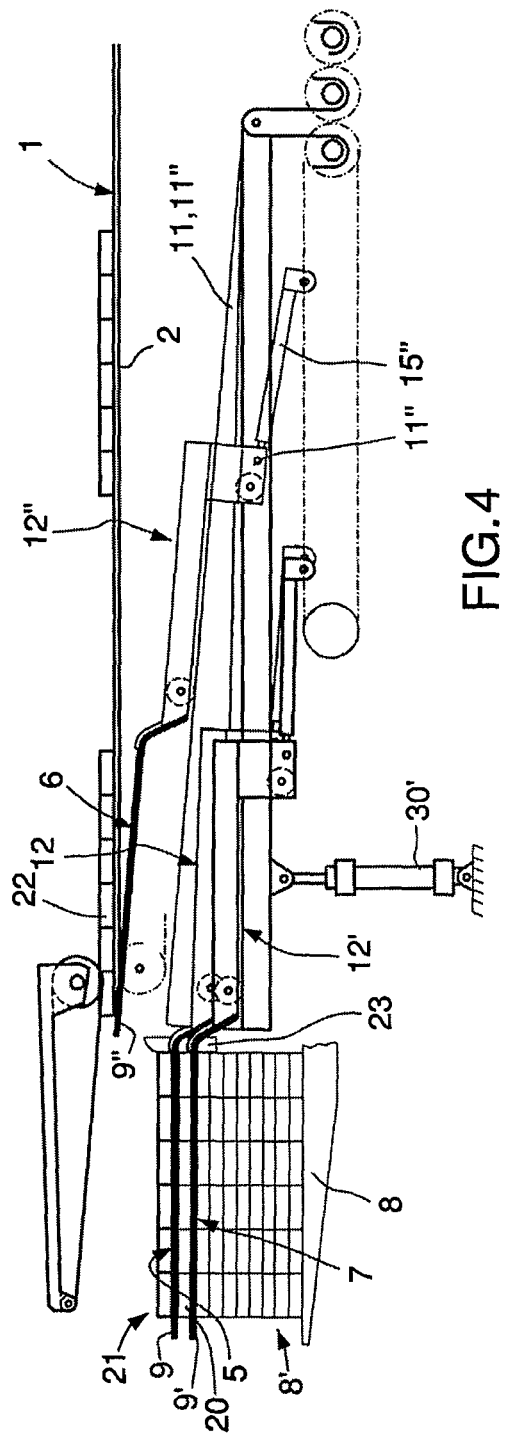
FIG. 4 shows a side view of an arrangement according to the invention.

The invention will be described in more detail below with reference to the attached drawings, in which FIG. 1 shows schematically a side view of an arrangement according to the invention in a first phase of the stacking cycle of the arrangement, FIG. 2 shows a plan view of a part of the arrangement shown in FIGS. 1 and 3, and FIG. 3 shows a side view of an arrangement according to invention in a second phase of the stacking cycle of the arrangement.

In FIG. 1, an input transporter in the drawings is generally denoted by the reference number 1. This input transporter 1 is arranged for the feed of pieces of timber and consists of a number of endlessly running elements in the form of chains 2 next to each other, on which the pieces of timber are collected into layers and fed forwards in their transverse direction. This speed of this input transporter 1, measured as the number of layers per minute, can be regulated as desired, with, for example, the aid of a variator (not shown in the drawings), which may be connected to the drive shaft (also this not shown in the drawings) for the chains 2 of the input transporter, which pass over chain wheels 4 at the delivery end 3 of the said transporter. The speed of the input transporter 1 is recorded by, for example, a pulse sensor arranged on the said drive shaft, and it is passed to a programmed control unit (not shown in the drawings) for the packager according to the invention.

First, second and third carrier planes 5, 6 and 7 that can be independently displaced are arranged in direct association with the delivery end 3 of the input transporter 1, according to the present invention. The carrier planes are arranged by means of parallel transfer arms to move in sequence one after the other, where each plane functions, respectively, as a transfer arrangement between the delivery end 3 of the input transporter 1 and a lift arrangement that is a component of the packager. The three carrier planes 5, 6 and 7 thus form part of the said transfer arrangements, and are arranged to carry out cyclic motion controlled by the said control unit in a manner that will be described in more detail below.

The first carrier plane 5 is shown in FIG. 1 located in a position as a continuation of the input transporter 1 and during the transfer of a layer from the input transporter 1 to the lift arrangement 8, while the third carrier plane 7 is shown in FIG. 1 prepared to take over the layer-transfer task of the first carrier plane 5, when the said third carrier plane, after having received a layer, transfers this to a timber package that is in the process of construction, generally denoted by the reference number 8', that is supported by a stacking table that is part of the lift arrangement and that can be raised and lowered, which stacking table is arranged after the delivery end 3 of the input transporter 1. As is made clear by FIG. 1, the first carrier plane 5 and the third carrier plane 7 are located in a position above the stacking table 8 at the same time.

The carrier plane 5 comprises a number of fingers 9 that lie beside each other and that can be displaced, each arranged along a guide 11 that is arranged such that it can be pivoted around a point 10, and the fingers are supported by the relevant guides 11 each by the relevant trolley 12 with at least two running wheels 13 on the upper surface of the associated guide and with at least one counter-wheel 14 on the lower side of the same guide. In order to arrange the movement of the trolleys, and thus also of the fingers of the carrier plane, along the guides 11, the trolleys are united through a link 15 each to a drive mechanism 16, which comprises an endless chain 17 or similar, which is arranged around the chain wheels 18, one of which is fixed connected to a drive shaft 19. This drive shaft is common for all drive mechanisms 16 for the first carrier plane, which is denoted by reference number 5, and the fingers of the carrier plane will in this way be displaced synchronously. In order to achieve raising and lowering of the first carrier plane 5, the guides 11 can be pivoted around their common bearing point 10 by means of an adjustment and operating device 30, one such for each guide in the embodiment shown, while in other embodiments the guides may be mutually united through a transverse beam, not shown in the drawings, whereby the number of adjustment and operating devices can be reduced by an extremely significant amount.

If it is the case, as it is in the present embodiment, that one adjustment and operating device 30 is arranged at each guide 11, then all adjustment and operating devices are driven synchronously, such that the fingers 9 of the first carrier plane 5 are maintained at the same height as each other. The carrier planes 6 and 7 are designed in an identical manner as the carrier plane 5 and are driven in the same manner as this, and they will therefore not be described in more detail. The reference numbers that relate to the various elements of this carrier plane, however, have been given prime marks and double-prime marks, respectively, for reasons of clarity. Thus 9' denotes the fingers of the second carrier plane 6 and 30', for example, denotes the adjustment and operating device for raising and lowering the said second carrier plane 6, while 9" denotes the fingers of the third carrier plane 7 and 30" the adjustment and operating device for raising and lowering the said third carrier plane 7.

The first carrier plane 5 is shown in FIG. 1 at a phase of its cyclic motion or the stacking cycle, during which a first layer 21 of pieces of timber has been brought to a position where it is to be transferred from the input transporter 1 for placement down onto the stacking table 8 of the lift arrangement, which stacking table can be raised and lowered and which is located below the input transporter, through the first carrier plane 5 moving forwards along its guides 11 synchronously with the layer that is arriving, to a sufficient distance beyond the delivery end 3 of the input transporter 1 that the carrier plane and its point will be located at a distance from the delivery end 3 of the input transporter 1 that corresponds to at least the width of the layer 21 that is arriving on the input transporter 1.

As soon as the complete layer 21 has been taken onto the fingers 9 of the first carrier plane 5, the carrier plane 5 continues to travel forwards along its guides 11 as does also the third carrier plane 7, which is positioned in its position of preparedness, along its guides 11", which in this condition adopt the same gradient as the guides 11 of the first carrier plane 5.

The third carrier plane 7 is subsequently displaced forwards along the guides 11" with its end at such a distance from the delivery end 3 of the input transporter 1 that it corresponds at least to the width of an arriving second layer 22, and that this layer is taken onto the fingers 9" of the third carrier plane 7 in a careful manner as these fingers are displaced upwards. The first carrier plane 5, meanwhile, is displaced to a position above the stacking table 8, such that the final piece of timber in the layer 21 has its outermost edge in a location that is somewhat to the side of a counterpiece 23 that is a component of the stacking table 8.

The first carrier plane 5 with its layer 21 is then lowered from this position through the influence of the adjustment and operating device 30 in order to deposit the layer onto the uppermost layer of timber on the stacking table 8, which layer is supported by the fingers 9' of the second carrier plane 6 and is located at a position inside the stacking table 8. As soon as the first carrier plane 5 with its layer 21 is located such that the lowermost edge of its fingers 9 interact or make contact with the upper surface of the most recently placed layer, which is supported by the second carrier plane 6 and is denoted 20, the second carrier plane 6 is returned to a rear end position on the guides 11', while the layer 20 is withdrawn towards the counterpiece 23 (see FIG. 3). As is made clear by FIG. 3, the first carrier plane 5 and the third carrier plane 7 are located in a position above the stacking table 8 at the same time. The second carrier plane 6 is at this time being withdrawn from the stacking table 8 while the layer of timber 20 is being scraped off against the counterpiece 23. It should be understood that the first carrier plane 5 and the second carrier plane 6 were located in a position above the stacking table 8 at the same time, immediately before the scraping off operation commenced.

The said guides 11' are subsequently pivoted upwards by the adjustment and operating device 30' such that they acquire the same gradient as the guides 11" for the third carrier plane 7, at which time the second carrier plane 6 is displaced to a position of preparedness behind the third carrier plane 7 such that it will be possible to place it rapidly into the location of this carrier plane when the third carrier plane transfers its layer to the stacking table 8.

The forward feed of the carrier planes 5, 6 and 7 during the transfer of layers from the input transporter 1 may take place either continuously or in steps, and this forward feed is controlled by the said control unit according to the speed of the input transporter 1. The motion of the carrier planes 5, 6, 7 along the relevant guides 11, 11' and 11" to the position above the stacking table, the withdrawal of the carrier planes and the displacement of these to the position of preparedness behind the carrier plane that is located at its layer-transfer position and which thus constitutes a continuation of the input transporter should thus take place relatively rapidly, in any case should the return of the carrier planes to the position of preparedness take place rapidly, such that a carrier plane has time to reach its position of preparedness with a good margin of safety before a layer is to be rapidly transferred. These movements, and the raising and lowering of the carrier planes with the aid of the adjustment and operating devices 30, 30', 30" are also controlled with the aid of the said programmed control unit.

After the delivery end 3 of the input transporter 1, when seen in the direction of transport of the layers of timber 21, 22 there is arranged a support 40 with endlessly running transport elements in the form of a number of parallel bands 41, which bands are oriented parallel to the input transporter 1 and rotate with a speed that corresponds to the speed of the input transporter. Thus, in association with the displacement forwards of a carrier plane 5 along the guides 11 with its end past the delivery end 3 of the input transporter 1, an arriving layer 21 is taken in a controlled manner between the fingers 9 of the carrier plane and the lower part 41 of the transporter, as is shown in FIG. 1, as the carrier plane 5 is gradually displaced upwards. It is appropriate that the endlessly running transport elements be mounted under spring loading in order to accommodate any irregularities that are present in the layers of timber.

Through the use of at least three carrier planes working in cyclical motion, it is possible, according to the invention, to use one of the carrier planes at a packager as a holder in such a manner that the said holder interacts with the upper surface of the most recently laid layer of timber through pressing this layer of timber down in a retaining manner while a carrier plane that is positioned farther down in the stacking table 8 of the lift arrangement is at the same time withdrawn from the package. In this way, the advantage is achieved that the construction of layers can take place without any carrier plane that is transferring wood being required to wait for the holder of the packager to be withdrawn from the upper surface of the timber package before a new layer of timber can be placed onto the uppermost layer of timber in the stacking table of the lift arrangement. The packaging according to the invention can, in contrast, be carried out continuously. The previously experienced problems of the holder acting to limit the speed with which a packager can be operated are thus solved.

The present invention is not limited to what has been described above and shown in the drawings: it can be changed and modified in several different ways within the scope of the innovative concept defined by the attached patent claims.

What is claimed is:

1. An arrangement for the stacking in layers of timber packages, comprising a transfer arrangement, the transfer arrangement comprising several individual carrier planes that are mobile one after the other around a cyclic path arranged to transfer one layer at a time from an input transporter to a stacking table that can be raised and lowered, whereby the transfer arrangement is so arranged at the delivery end of the input transporter that the carrier planes in turn form a direct continuation of the input transporter in order to receive layers fed from this transporter by being caused to lift from below a complete layer from the input transporter and displace the layer in over the stacking table, after which the carrier planes are withdrawn from the stacking table while the layer of timber is scraped off from the carrier plane through interaction with a counterpiece arranged at the stacking table such that the layer is laid directly onto the carrier arms of the stacking table or, when a layer has previously been laid onto these arms, onto the uppermost layer of timber, whereby the stacking table is arranged to move downwards in steps with the growth of the timber package to a corresponding degree until the package has been completely formed, wherein the transfer arrangement comprises a first, a second and a third carrier plane, which are individually movable by a respective drive and arranged to move cyclically in such a manner that a pair of two consecutive carrier planes is located at the same time in a position directly above the stacking table and that the carrier plane of the said pair that has arrived at the stacking table most recently is retained in its position above the stacking table while the carrier plane of the pair that arrived at the stacking table first is withdrawn from the stacking table while the layer is being scraped off.

2. The arrangement according to claim 1, whereby the carrier plane that has arrived most recently at the stacking table of the pair interacts in a retaining manner through contact with the upper surface of a layer supported by carrier plane that first arrived at the stacking table at the same time as this carrier plane is withdrawn from the stacking table while the layer is being scraped off.

3. The arrangement according to claim 1, whereby each carrier plane comprises a number of fingers that lie beside each other and that can be displaced, each arranged along a guide each of which is arranged such that it can be pivoted around a point, which fingers are supported by the relevant guides each by the relevant trolley with at least two running wheels on the upper surface of the associated guide and with at least one counter-wheel on the lower side of the same guide.

4. The arrangement according to claim 1, comprising an adjustment and operating device arranged at each guide with which the carrier planes can be continuously raised and lowered on the said respective guide.

5. The arrangement according to claim 1, whereby the carrier planes are arranged to be displaced forwards along the guides each with its point at such a distance from the delivery end of the input transporter that it corresponds at least to the width of an arriving second layer such that the layer is taken in a careful manner onto the fingers of the carrier plane as these fingers are subsequently displaced upwards.

6. The arrangement according to claim 1, comprising an endlessly running transport element oriented parallel with the input transporter and arranged in such a manner that the layers are transferred from the input transporter to the fingers of the carrier planes through interaction between a lower part of said transport elements and the layers.

7. A method for the stacking in layers of timber packages comprising:
operating a transfer arrangement according to claim 1;
wherein said operating comprises:
feeding a plurality timbers into an input transporter of the transfer arrangement;
wherein said fed timbers are configured to be transferred to one of the first, second, or third carrier planes that forms a direct continuation of the input transporter at the delivery end of the input transporter in order to receive one layer of timbers at a time fed from the transporter;
wherein the layer of timbers transferred to the one of the first, second, or third carrier planes is lifted and displaced onto the stacking table;
wherein, after displacing the layer over the stacking table, the layer of timber is scraped off from one of the first, second, or third carrier planes through interaction with a counterpiece arranged at the stacking table such that the layer is laid directly onto carrier arms of the stacking table or, when there is a layer previously laid on the carrier arms and thus the layer is laid onto the uppermost layer of timber, the stacking table is arranged to move downwards in steps with the growth of the timber package to a corresponding degree until the package has been completely formed.

8. The method according to claim 7, whereby the carrier plane that has arrived most recently at the stacking table of the pair interacts in a retaining manner through contact with the upper surface of a layer supported by the carrier plane that first arrived at the stacking table at the same time as this carrier plane is withdrawn from the stacking table while the layer is being scraped off.

9. The method according to claim 8, whereby the carrier plane that arrives later in the cycle makes contact with and rests against the upper surface of the layer that is supported by the carrier plane that arrived first at the same time as the carrier plane that arrived first is withdrawn from the stacking table while the layer is being scraped off.

10. The method according to claim 8, whereby the carrier planes are of the type that supports the layers on a number of fingers that lie next to each other, and in that the lower side of said fingers is used as a holder through interaction with the upper surface of a layer that has first been laid onto the stacking table.

11. The method according to claim 7, whereby complete layers are lifted from the input transporter through interaction with a lower part of an endlessly running element that is driven to rotate.

12. An arrangement for stacking timber packages in layers, comprising a transfer arrangement, wherein the transfer arrangement comprises:
an input transporter;
a first carrier plane;
a second carrier plane;
a third carrier plane; and
a stacking table;
wherein the first carrier plane, the second carrier plane, and the third carrier plane are individually movable by a respective drive and arranged to move cyclically in such a manner that a pair of two consecutive carrier planes are located at the same time in a position directly above the stacking table and that one of the carrier planes of said pair that has arrived at the stacking table most recently is retained in its position above the stacking table while the other carrier plane of the pair that arrived at the stacking table first is withdrawn from the stacking table while the layer is being scraped off;
wherein said first, second, and third carrier planes are individually movable by a respective drive and mobile one after the other around the cyclic path arranged to transfer one layer at a time from the input transporter to the stacking table that can be raised and lowered;
wherein said first, second, and third carrier planes in turn form a direct continuation of the input transporter at the delivery end of the input transporter in order to receive one layer at a time fed from the transporter, lift the layer from below and displace the layer over the stacking table;
wherein, after displacing the layer over the stacking table, said first, second, and third carrier planes are withdrawn from the stacking table while the layer of timber is scraped off from said first, second, and third carrier planes through interaction with a counterpiece arranged at the stacking table such that the layer is laid directly onto carrier arms of the stacking table or, when there is a layer previously laid on the carrier arms and thus the layer is laid onto the uppermost layer of timber, the stacking table is arranged to move downwards in steps with the growth of the timber package to a corresponding degree until the package has been completely formed.

13. The arrangement according to claim 12, wherein each carrier plane comprises a number of fingers that lie beside each other and that can be displaced; each finger is arranged along a guide, and the guide is arranged such that the guide can be pivoted around a point; and the fingers are supported by the relevant guides, each guide operated by a relevant trolley with at least two running wheels on the upper surface of the associated guide and with at least one counter-wheel on the lower side of the same guide.

14. The arrangement according to claim 12, comprising an adjustment and operating device arranged at each guide with which the carrier planes can be continuously raised and lowered on the said respective guide.

15. The arrangement according to claim 12, wherein the carrier planes are arranged to be displaced forward along the guides each with its point at such a distance from the delivery end of the input transporter that it corresponds at least to the width of an arriving second layer such that the layer is taken in a careful manner onto the fingers of the carrier plane as these fingers are subsequently displaced upwards.

16. The arrangement according to claim 12, comprising an endlessly running transport element oriented parallel with the input transporter and arranged in such a manner that the layers are transferred from the input transporter to the fingers of the carrier planes through interaction between a lower part of said transport elements and the layers.

17. A method for the stacking in layers of timber packages comprises:
operating a transfer arrangement according to claim 12;
wherein said operating comprises:
feeding a plurality of timbers into an input transporter of the transfer arrangement;
wherein said fed plurality of timbers are configured to be transferred to one of the first, second, or third carrier planes that forms a direct continuation of the input transporter at the delivery end of the input transporter in order to receive one layer comprising the plurality of timbers at a time fed from the transporter;

wherein the layer transferred to the one of the first, second, or third carrier planes is lifted and displaced onto a stacking table;

wherein after displacing the layer over the stacking table, the layer is scraped off from one of the first, second, or third carrier planes through interaction with a counterpiece arranged at the stacking table such that the layer is laid directly onto carrier arms of the stacking table or, when there is a layer previously laid on the carrier arms and thus the layer is laid onto the uppermost layer of timber, the stacking table is arranged to move downwards in steps with the growth of the timber package to a corresponding degree until the package has been completely formed.

18. The method according to claim 17, whereby the carrier plane that arrives later in the cycle makes contact with and rests against the upper surface of the layer that is supported by the carrier plane that arrived first at the same time as the carrier plane that arrived first is withdrawn from the stacking table while the layer is being scraped off.

19. The method according to claim 17, wherein the carrier planes are of the type that supports the layers on a number of fingers that lie next to each other, and in that the lower side of said fingers is used as a holder through interaction with the upper surface of a layer that has first been laid onto the stacking table.

20. The method according to claim 17, wherein complete layers are lifted from the input transporter through interaction with a lower part of an endlessly running element that is driven to rotate.

* * * * *